March 22, 1966 A. K. JENSEN 3,242,351

MEMORY DEVICE UTILIZING A SLOW RECOVERY DIODE TO CHARGE A CAPACITOR

Filed April 10, 1962

INVENTOR.
ALAN K. JENSEN
BY
Charles L. Johnson Jr.
ATTORNEY 3,242,351

MEMORY DEVICE UTILIZING A SLOW RECOVERY DIODE TO CHARGE A CAPACITOR

Alan K. Jensen, Dover, N.J., assignor to Monroe International Corporation, a corporation of Delaware Filed Apr. 10, 1962, Ser. No. 186,511
5 Claims. (Cl. 307—88.5)

This invention relates generally to information memory devices and more particularly to an electronic circuit which may be utilized to store one bit of information.

One of the fundamental aspects of computer apparatus is the need for storage or memory apparatus. Many arrangements have been developed to satisfy this need, but each has had disadvantageous limitations resulting either from high cost or low operating speed. It is to the improvement of this situation that the present invention is directed.

It is therefore a broad object of the invention to provide an improved memory device.

It is a further object of the invention to provide a high speed low cost memory device utilizing a storage diode.

One feature of the invention is the use of a storage diode to recharge capacitance to cycle or maintain a state of operation. The maintenance of this state of operation represents one of the two conditions of the memory circuit.

These and other objects and novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

In realizing the objects of the invention, a storage or slow reverse recovery diode is utilized to maintain a circuit condition. In this manner one state of a two state circuit is provided and a high speed memory device results.

The storage diode or slow reverse recovery diode mentioned herein may be any of the type of diode which exhibits a reverse transient current characteristic. In brief the operation of such a diode is that certain physical phenomena occurring within a semiconductor diode, which has been conducting and is abruptly back-biased, will produce a momentary surge of reverse current before the usual rectifying barrier is established. In this invention this momentary surge is utilized to charge capacitance so as to maintain a cycling operation until such time as it is desired to reset the memory circuit.

Figures 1, 2:
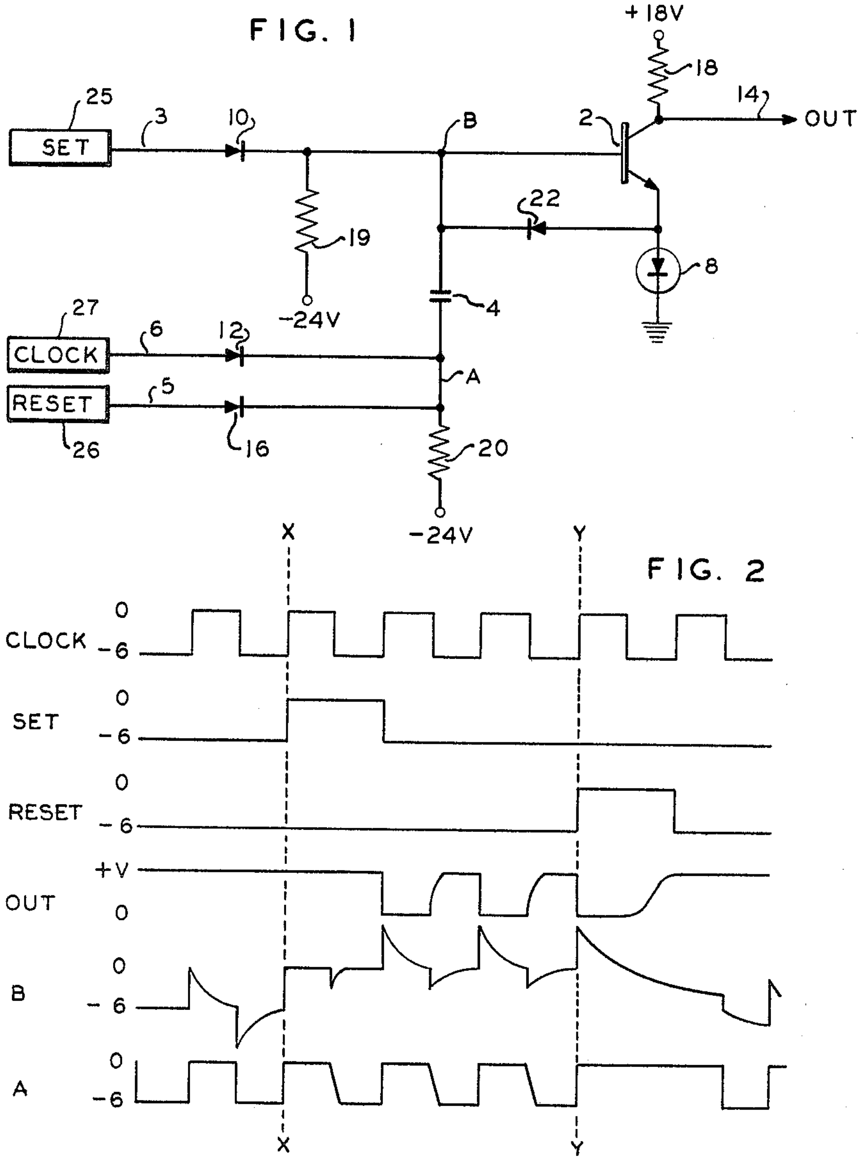
FIG. 1 is a schematic drawing of a preferred embodiment of the invention.
FIG. 2 illustrates voltage waveforms experienced at various points in the schematic of FIG. 1.

The operation of the invention may best be understood from FIG. 1. Operative memory states will be defined by the conventional designations Set and Reset. Control signals are used to Set and Reset the memory. The general operation of the memory circuit is such that to Set the memory, the base of the transistor is brought up to ground potential. The condenser charges during the lower potential portions of the clock periods and discharges into the transistor base during the higher potential portions of the Clock pulses. The capacitance discharge current is multiplied by the forward current transfer ratio (Beta) of the transistor and stored as carriers in the storage diode 8. Recharge of the capacitance is accomplished by the reverse current from the storage diode. This cycling of charging and discharging will yield a pulsed output on the transistor collector so long as the memory is Set and will return to a D.C. output upon occurrence of a Reset pulse.

Examining FIG. 1 in more detail in conjunction with the waveforms of FIG. 2 it may be seen that the Set, Reset and Clock pulses applied to terminals 3, 5, and 6 of FIG. 1 are shown graphically in FIG. 2 and each varies between −6 and 0 volts. Signal generators 25, 26, and 27 may be any of the several well-known signal generator circuits or devices for generating the signals applied to terminals 3, 5, and 6. Assuming the memory circuit is in the Reset condition, the occurrence of a Set pulse at terminal 3 conducting through diode 10 pulls the base of the transistor 2 to ground potential. This may be seen at the time X designated in the FIG. 2 graphs. The conduction of the Clock pulses from terminal 6 through diode 12 allows the capacitance 4 to charge during that portion of the Clock pulse which is at −6 volts. During the time the Clock pulse is at 0 volts the capacitance discharges into the base of the transistor 2.

The clock side of the capacitance is designated A and the transistor base side is denoted B and the potentials at these points are graphically illustrated in FIG. 2.

The discharge current of the capacitance is multiplied by the Beta of the transistor and stored as carriers in the storage or slow reverse recovery diode 8. Recharge of the capacitance 4 is thereafter accomplished by the reverse current from the diode 8 through diode 22. This cycling type of operation shall continue, maintaining the memory in this Set condition until such time as the clock is stopped or until the diode reverse current is diverted. It is seen that the output conductor 14 provides a pulsed output during this period.

Upon the occurrence of a Reset pulse on conductor 5 through diode 16, the cycling is terminated due to the Reset pulse preventing the charge of the capacitance. This is shown at time Y on the FIG. 2 graphs. At high frequencies the Reset pulse may have to exceed one clock period in order to assure dissipation of all the stored carriers in the diode. With the termination of the cycling the output returns to a steady plus potential and the memory is in a Reset condition.

It is thus seen that the objects of the invention have been realized by utilizing the slow reverse recovery diode phenomena.

In the preferred embodiment of the invention illustrated schematically by FIG. 1 the waveforms similar to those of FIG. 2 were realized when the following component values were used with the supply potentials indicated in FIG. 1 and a clock frequency of from 250 kilocycles to one megacycle.

| | | |
|---|---|---|
| Transistor **2** | | 2N94 |
| Capacitance **4** | μμf | 500 |
| Diode **8** | | 1N91 |
| Resistor **18** | ohms | 2,000 |
| Resistor **19** | do | 51,000 |
| Resistor **20** | do | 2,000 |
| Diode **22** | | 1N636 |

Alteration of the parameters and/or transistor type will of course allow operation through other frequency ranges. Also it should be noted that a PNP transistor may be utilized if power supply and diode polarity are appropriately reversed.

Figure 3:
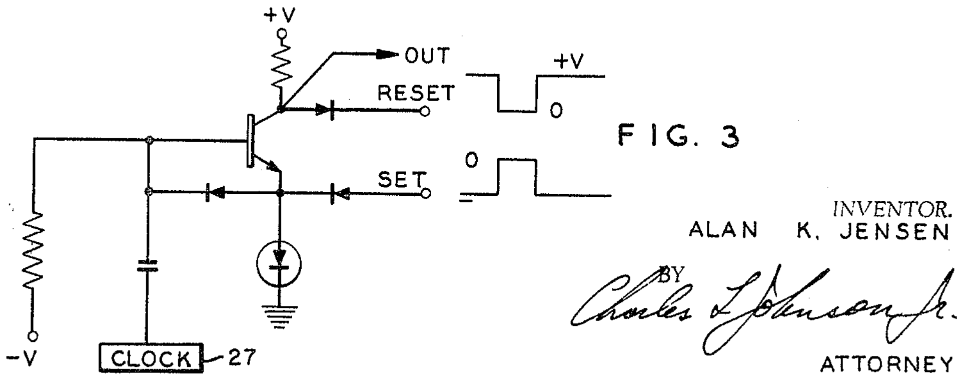
FIG. 3 illustrates a schematic variation of the invention.

FIG. 3 illustrates other means of setting and resetting the memory. In FIG. 3 a positive Set pulse is applied directly to the storage diode while Reset is obtained by the application of a negative pulse to the transistor collector.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Two state electronic memory device apparatus responsive to control signals for assuming either of two operating states in accordance therewith comprising: clock control signal means for producing a continuous train of clock control signals; cycling means including a condenser and a slow recovery diode coupled in series with said clock control signal means; said condenser being charged and discharged in accordance with changes in said clock control signals and said condenser further being charged via said slow recovery diode during portions of said clock control signals; and a control signal means coupled to said condenser for selectively supplying control signals for discharging said condenser; said condenser and said slow recovery diode in response to said clock control signals causing said cycling means to produce a variable potential output signal representative of a first of said two operating states of said electronic memory device apparatus; said condenser in response to said control signals being discharged causing said cycling means to terminate the production of said variable potential output signal, said termination representative of the second of said two operating states of said electronic memory device apparatus.

2. The apparatus of claim 1 including transistor means coupled in series between said condenser and slow reverse recovery diode whereby discharge current from the condenser is amplified by the transistor means and conducted to the slow reverse recovery diode.

3. Electronic memory apparatus comprising control signal means including means for generating Set, Reset and Clock signals, cycling means operatively connected to the control signal means and including capacitance means, transistor means and storage diode means interconnected to cyclically charge and discharge the capacitance upon the application of the Set control signal to the capacitance and to terminate the cyclical charging operation upon application of a Reset control signal to the capacitance.

4. The apparatus of claim 3 wherein the storage diode is interconnected between the capacitance and transistor, and the transistor is interconnected between the capacitance and storage diode whereby the storage diode periodically acts to charge the capacitance so as to maintain the cyclical charging and discharging of the capacitance.

5. The apparatus of claim 4 wherein an output connection is connected to the transistor so as to monitor the cyclical capacitive charging and discharging which indicates one state of the memory apparatus.

References Cited by the Examiner

UNITED STATES PATENTS

| | | | |
|---|---|---|---|
| 2,706,247 | 4/1955 | Jacobs et al. | 328—121 |
| 2,974,293 | 3/1961 | Fryklund | 328—67 X |
| 2,976,429 | 3/1961 | Abbott et al. | 307—88.5 |
| 2,997,659 | 8/1961 | Abbott et al. | 307—88.5 |
| 3,038,084 | 6/1962 | Miranda et al. | 307—88.5 |
| 3,070,779 | 12/1962 | Logue | 307—88.5 |

ARTHUR GAUSS, *Primary Examiner.*

JOHN W. HUCKERT, *Examiner.*